United States Patent
Conner

(10) Patent No.: US 9,267,806 B2
(45) Date of Patent: Feb. 23, 2016

(54) SYSTEM AND METHOD FOR AUTOMATICALLY RECEIVING GEO-RELEVANT INFORMATION IN A VEHICLE

(75) Inventor: Brian Conner, Greenville, SC (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 300 days.

(21) Appl. No.: 13/220,443

(22) Filed: Aug. 29, 2011

(65) Prior Publication Data

US 2013/0054132 A1 Feb. 28, 2013

(51) Int. Cl.
*G01C 21/34* (2006.01)
*G01C 21/00* (2006.01)
*G08G 1/0968* (2006.01)
*G01C 21/26* (2006.01)
*G01C 21/36* (2006.01)

(52) U.S. Cl.
CPC ........ *G01C 21/3407* (2013.01); *G01C 21/3679* (2013.01); *G01C 21/3691* (2013.01); *G01C 21/26* (2013.01); *G01C 21/34* (2013.01); *G01C 21/3617* (2013.01); *G08G 1/096833* (2013.01); *G08G 1/096844* (2013.01)

(58) Field of Classification Search
CPC .... G01C 21/32; G01C 21/34; G01C 21/3415; G01C 21/3492; G01C 21/3605; G01C 21/3667; G01C 21/3691; G01C 21/3694; G08G 1/096811; G08G 1/096816; G08G 1/096833; G08G 1/096844; G08G 1/0969
USPC ......... 701/400, 409–412, 414–415, 423, 420, 701/424; 340/995.19, 995.21, 995.23
See application file for complete search history.

(56) References Cited

U.S. PATENT DOCUMENTS

| | | | |
|---|---|---|---|
| 6,324,467 B1 * | 11/2001 | Machii et al. | 701/420 |
| 6,336,073 B1 * | 1/2002 | Ihara et al. | 701/533 |
| 6,591,188 B1 | 7/2003 | Ohler | |
| 6,636,801 B2 * | 10/2003 | Curbow | 701/516 |
| 6,748,316 B2 * | 6/2004 | Takayama et al. | 701/428 |
| 6,870,478 B2 * | 3/2005 | Yasushi et al. | 340/573.7 |
| 6,978,208 B2 * | 12/2005 | Endo et al. | 701/420 |
| 7,058,506 B2 * | 6/2006 | Kawase et al. | 701/410 |
| 7,130,743 B2 * | 10/2006 | Kudo et al. | 701/424 |
| 7,233,861 B2 * | 6/2007 | Van Buer et al. | 701/424 |
| 7,565,155 B2 * | 7/2009 | Sheha et al. | 455/456.1 |
| 7,630,828 B2 * | 12/2009 | Tajima et al. | 701/118 |
| 7,805,240 B2 | 9/2010 | Naitou et al. | |
| 7,908,080 B2 * | 3/2011 | Rowley et al. | 701/423 |
| 2002/0091486 A1 * | 7/2002 | Hubschneider et al. | 701/209 |
| 2004/0128066 A1 | 7/2004 | Kudo et al. | |

(Continued)

*Primary Examiner* — Jack W Keith
*Assistant Examiner* — Chuong P Nguyen
(74) *Attorney, Agent, or Firm* — Crowell & Moring LLP

(57) ABSTRACT

Path-relevant information is provided by a backend server system to a vehicle without an input or request from the vehicle operator. Program applications, including a web browser application, records vehicle route data in a local memory during vehicle travel. Such vehicle route data may include current GPS coordinates, time of day, day of week, etc. The recorded vehicle route data may then be used to locally generate one or more route prediction models. A predicted vehicle route may be generated from the route prediction models. Once a vehicle route has been predicted, coordinate data corresponding to the predicted route may be transmitted to a backend server. Thereafter, path-relevant information, based on the transmitted coordinate data, may then be received from the backend server, and without the vehicle operator having to provide any input or request.

24 Claims, 2 Drawing Sheets

(56) References Cited

U.S. PATENT DOCUMENTS

| | | |
|---|---|---|
| 2005/0015197 A1* | 1/2005 | Ohtsuji et al. ............... 701/202 |
| 2005/0027447 A1* | 2/2005 | Hirose et al. ................ 701/210 |
| 2005/0071078 A1 | 3/2005 | Yamada et al. |
| 2005/0125148 A1* | 6/2005 | Van Buer et al. ............ 701/209 |
| 2007/0150174 A1 | 6/2007 | Seymour et al. |
| 2007/0156334 A1 | 7/2007 | Vu |
| 2008/0133125 A1* | 6/2008 | Nomura ........................ 701/201 |
| 2010/0094537 A1 | 4/2010 | Goto et al. |
| 2012/0065815 A1* | 3/2012 | Hess ................................. 701/2 |
| 2012/0084349 A1* | 4/2012 | Lee et al. ...................... 709/203 |
| 2012/0270558 A1* | 10/2012 | Busch et al. ................ 455/456.1 |
| 2012/0323992 A1* | 12/2012 | Brobst et al. ................. 709/203 |

* cited by examiner

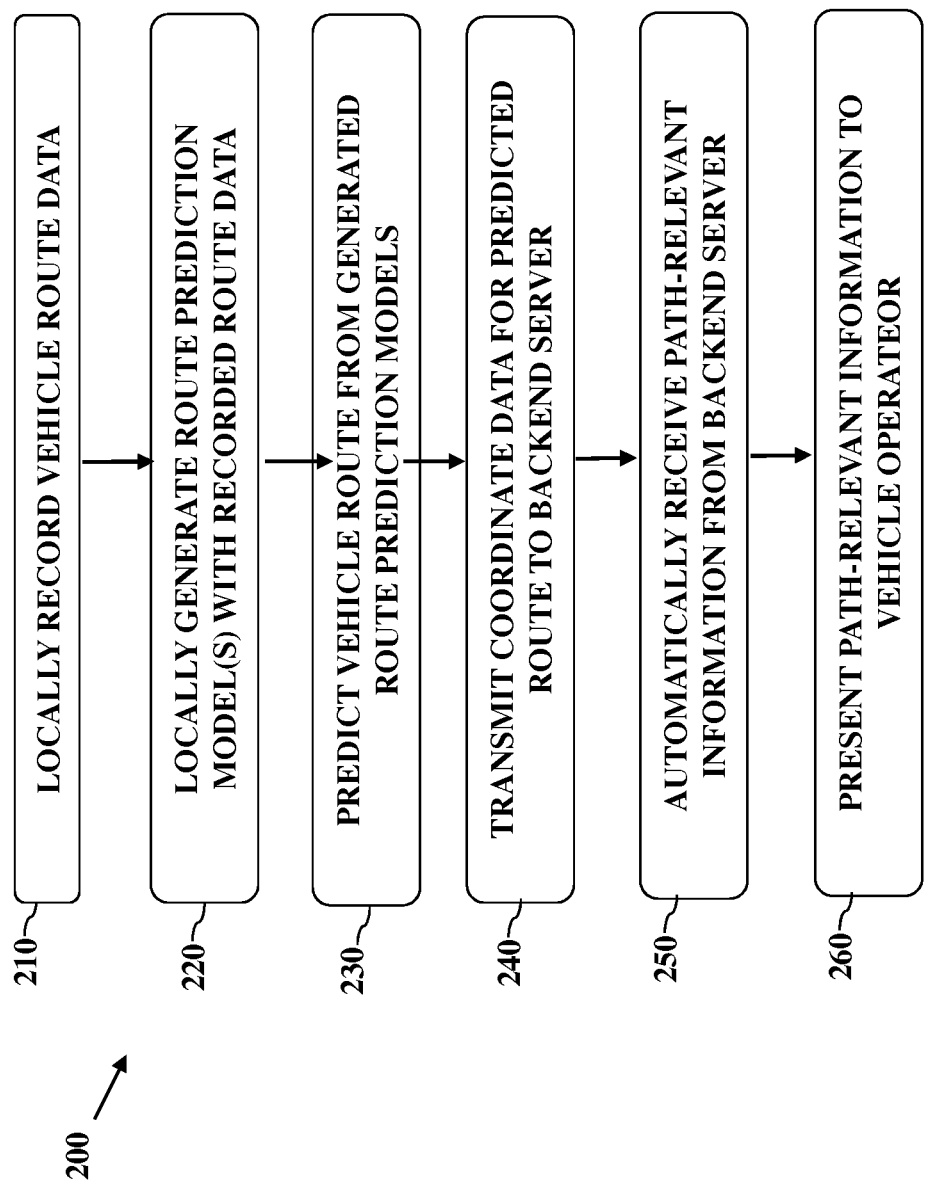

SYSTEM AND METHOD FOR AUTOMATICALLY RECEIVING GEO-RELEVANT INFORMATION IN A VEHICLE

FIELD OF THE INVENTION

The present invention relates generally to automatically presenting path-relevant information to a vehicle operator and, more particularly, to automatically presenting path-relevant information to a vehicle operator based on a predicted route of the vehicle.

BACKGROUND OF THE INVENTION

"Geographically-relevant information" is generally used to describe information that has the potential to be useful to someone at a particular physical location. For example, geographically-relevant information may include business locations, weather conditions, traffic conditions, safety information, street/road topologies, upcoming speed limit changes, points of interest, naturally occurring physical structures, etc.

While there are known systems that provide geographically-relevant information to vehicle operators, such systems suffer from two drawbacks. First, they are typically limited to providing geographically-relevant information based only on the vehicle's current position. This is disadvantageous because the driver may not have sufficient time to react to the information (e.g., location of a gas station, road conditions, etc.) before it is too late.

An improvement on the above system that some modern in-vehicle navigation systems have realized is to use destination information entered by the vehicle operator to access geographically-relevant information. However, requiring the vehicle operator to enter such destination information is tedious and distracting. And in cases where the driver has not taken the trouble to enter any destination information, at best the driver will only be able to access information that is potentially relevant to the vehicle's then-current position.

Therefore, there is a need for a system and method of automatically presenting path-relevant information to a vehicle operator based on a predicted route.

SUMMARY OF THE INVENTION

Disclosed and claimed herein are systems and methods for automatically presenting path-relevant information to a vehicle operator based on a predicted route. In certain embodiments, the method includes recording, in a local storage, vehicle route data during vehicle travel, and locally generating one or more route prediction models using the vehicle route data. The method also includes predicting a vehicle route from the generated route prediction models, and then transmitting coordinate data corresponding to the predicted vehicle route to a backend server over a wireless network connection. Additionally, the method includes receiving, in response to the transmitted coordinate data, path-relevant information from the backend server over the wireless network connection, and the presenting at least a portion of the path-relevant information to an operator of the vehicle.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 depicts one embodiment of a process for carrying out one or more aspects of the invention.

DETAILED DESCRIPTION OF THE EXEMPLARY EMBODIMENTS

Overview

Figure 1:
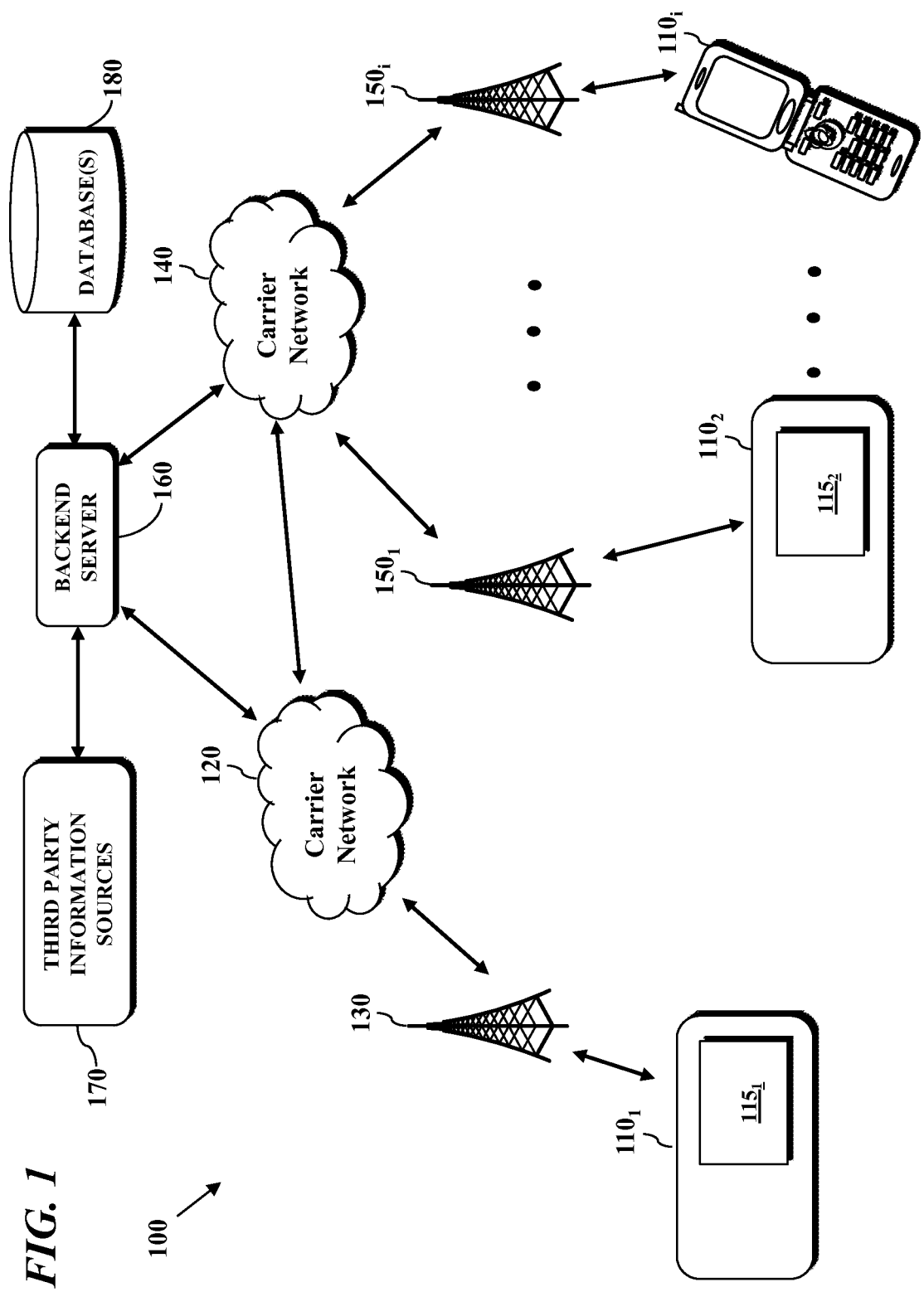
FIG. 1 is a block diagram illustrating an exemplary communication system in which one or more aspects of the invention may be implemented.

One aspect of the invention is to automatically present path-relevant information to a vehicle operator in a manner which does not require any input from the vehicle operator. The invention may be implemented using one or more program applications including a web browser application executing on an onboard computer system. As a vehicle travels, vehicle route data may be recorded in a local memory, such as the local web storage used by certain web browser applications. As described in more detail below, such vehicle route data may include current GPS coordinates, time of day, day of week, etc.

In certain embodiments, the recorded vehicle route data may then be used to locally generate one or more route prediction models using the onboard vehicle computer system, and without the need for external network connectivity. Based on user preferences and other data (e.g., time of day, day of week, etc.), and as explained in more detail herein, a vehicle route may then be predicted from the route prediction models.

Once a vehicle route has been predicted, coordinate data corresponding to the predicted route may be transmitted to a backend server. Thereafter, path-relevant information, based on the transmitted coordinate data, may then be received from the backend server, and without the vehicle operator having to provide any input or request. It should be appreciated that path-relevant information may include any information that has the potential to be useful to the vehicle operator while he/she travels along the predicted route.

In certain embodiments, the vehicle operator may be asked to confirm the accuracy of the predicted route. If the vehicle operator indicates that the predicted destination is not the one desired, or if the vehicle's path begins to deviate from the predicted route, the route prediction models may again be used to generate a new predicted vehicle route.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor storage medium, which may include any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

The term "backend server" means a functionally-related group of electrical components, such as a computer system in a networked environment which may include both hardware and software components, or alternatively only the software components that, when executed, carry out certain functions. The "backend server" may be further integrated with a database management system and one or more associated databases.

Exemplary Embodiments

FIG. 1 illustrates a block diagram of a communication system 100 configured to implement one or more aspects of the invention. In one embodiment, the communication system 100 is configured to provide cellular service to various mobile terminals, including cellular-enabled vehicle $110_1$ which communicates with a carrier network 120 via a local base station 130.

Carrier network 120 may be configured to provide a myriad of network layer services, including but certainly not limited to location-based service, messaging service, conferencing service, presence service, etc. In addition, the vehicle 110 may be equipped to provide numerous features and may also include various applications, such as browser applications, chat clients, email clients, Java, personal information management applications, etc.

Continuing to refer to FIG. 1, the communication system 100 will preferably service additional cellular-enabled vehicles, such as vehicles $110_2$-$110_i$. Vehicle $110_1$ together with vehicles $110_2$-$110_i$ will be generally referred to as "vehicles 110." Each of the vehicles 110 may be equipped with an onboard computer system (such as onboard computer system $115_1$ or $115_2$), a part of which may comprise a vehicle navigation system. While it should of course be appreciated that onboard vehicle computers are complex and comprise numerous interconnected subsystems, the invention does not depend on specific hardware design choices. Additionally, since the details of the various hardware components which comprise such onboard computer systems (e.g., system $115_1$ and $115_2$) (including vehicle navigation systems) are readily known in the art, they will not be repeated herein, except to note that such systems typically comprise one or more processors coupled to local processor-readable memory, a user interface (e.g., display screen), one or more input means or modes (e.g., voice input, touchscreen, etc.), a GPS transceiver, and a network interface for cellular communication.

Continuing to refer to FIG. 1, it should be appreciated that vehicles 110 may roam between different carrier networks, such as carrier network 120 and carrier network 140, and be correspondingly serviced by separate base stations $150_1$-$150_i$. In addition, it should be appreciated that carrier networks 120 and 140 may be GSM, CDMA, etc., and may be accessible using a variety of access technologies (e.g., IP Multimedia Subsystem).

The communication system 100 further comprises a backend server 160 coupled to a plurality of third party information sources 170. The backend server 160 is configured to communicate with the vehicles 110 via the carrier networks 120 and/or 140. It should also be appreciated that the backend server 160 may communicate with the plurality of third party information sources 170 using any known communication means, including for example ground-bound lines, wirelessly, etc. Additionally, the backend server 160 may be implemented using a plurality of geographically dispersed servers, or may be implemented in a more centralized architecture. Finally, the plurality of third party information sources 170 may comprise any form of information source, including for example, traffic monitoring systems, weather forecast system, business location databases, and the like.

The backend server 160 is further configured to access database(s) 180, which may be comprised of one or more databases, and may be located locally or remotely from the server 170.

Referring now to FIG. 2, depicted is one embodiment of a process 200 for carrying out one or more aspects of the invention. Process 200 may be carried out by a vehicle (e.g., vehicle 110) equipped with an onboard computer system capable of executing one or more program applications including, for example, one or more web browser applications. More particularly, process 200 may be carried out using various aspects of a web browser application that is configured to render or execute program code written in the HyperText Markup Language (HTML) standard, including HTML5, Cascading Style Sheets (CSS) and Javascript. One of the primary concerns with implementing new technologies in vehicles is system security and integrity. As such, onboard vehicle systems have been proprietary, closed systems. That is, third party applications have been largely precluded from accessing or running on onboard vehicle systems. At the same time, however, providing cutting edge functionality and forward compatibility are also important considerations for a vehicle manufacturer. As such, various aspects of the invention may be implemented using standard protocols, such as HTML5, CSS and Javascript or the like. In this fashion, broader compatibility on a forward basis can be achieved, while at the same time protecting the security and integrity of the vehicle's onboard computer system.

With the above considerations in mind, process 200 begins at block 210 with the on-board vehicle computer system recording vehicle route data in local storage. Such vehicle route data may include the current GPS coordinates, the corresponding time of day and day of week, and optionally the speed of travel at the recorded location. It should be appreciated that data information may be recorded on a continuous basis or a periodic basis (e.g., every 30 seconds, every 2 minutes, etc.). Alternatively, such data may be recorded on a movement basis. In other words, a new data set (i.e., GPS coordinates, time of day, etc.) may only be recorded once the vehicle has moved more than some threshold distance (e.g., 50 feet, 250 feet, etc.).

In certain embodiments, the newly-implemented local web storage feature of HTML5 may be used to carry out the operation of block 210. In more general terms, the Web storage or Document Object Model (DOM) applications being standardized by the World Wide Web Consortium (W3C)

may be used, irrespective of the HTML5 standard. Rather, what is pertinent to the invention is that process 200 be implemented using one or more web-based applications which are standard-based and provide local storage functionality.

Process 200 may then continue to block 220 where one or more route prediction models may be locally generated based on the above-recorded route data. In particular, both the route prediction models, and the recorded route data that is used to generate such models, may exist only locally in the vehicle such that the generating process of block 220 may be carried out using one or more applications executing on the onboard vehicle computer system, and without the need for external network connectivity. In this fashion, the modeling process may occur in a continuous fashion without regard to whether network connectivity is available at any particular point in time. Additionally, the vehicle operator's privacy can be protected since sensitive information about the vehicle operator's driving habits are not being transmitted and stored anywhere other than in the vehicle itself. It should also be appreciated that the specific implementation of any route prediction models used may vary.

Continuing to refer to FIG. 2, process 200 may then proceed to block 230 where a predicted vehicle route may be generated from the route prediction models based on a probabilities analysis that considers current and historical driving behavior data, time of day, day of week, etc. The predicted vehicle route, which corresponds to the route most likely current route/destination being traveled, may be presented to the vehicle operator for confirmation.

In certain embodiments, the operation of block 230 may occur shortly after a vehicle begins a trip, or at anytime point along the vehicle's travel. It may also be the case that a first predicted route is generated near the start of a trip based on, for example the vehicle's current location, time of day and day of week. However, after traveling some distance along a route that deviates from the originally-predicted route, the operation of block 230 may again be performed and a second predicted route be generated instead. By way of providing a non-limiting example, if a vehicle leaves the operator's residence at 8:00 am on Wednesday morning, the system may predict that the destination is the vehicle operator's place of employment. However, after traveling some distance that deviates from the route the operator typically takes to his/her place of employment (i.e., the initially predicted route), the process 200 may generate a new predicted vehicle route similarly based on the operator's previous behavior, such as the fact that the vehicle operator may occasionally stop by a gym for a workout before work. In this fashion, if the vehicle operator fails to confirm the accuracy of the predicted route, or if the vehicle's path begins to deviate from the predicted route by some threshold value, the route prediction models may iteratively be used to generate a new predicted vehicle route at block 230. Alternatively, the route prediction operation of block 230 may be performed on a periodic or continuous basis, and without regard to whether or not network connectivity is available at any particular point in time since the predictive models and the route data on which those models operate are all stored within the vehicle by the onboard vehicle computer system.

Once a vehicle route has been predicted at block 230, coordinate data may be transmitted to a backend server (e.g., backend server 160) at block 240. In certain embodiments, the coordinate data may be based on one or more of the GPS coordinates that lie along the predicted vehicle route. The data transmission may take place over a cellular-based network, such as the communication system 100 described above with reference to FIG. 1.

It should be appreciated that all of the coordinate data relating to the predicted route may be transmitted at once. Alternatively, only a portion of the coordinate data (e.g., closest coordinate data to vehicle's current position) may be transmitted at a time. Thus, the total amount of data transmitted may be minimized since the originally-predicted vehicle route may not turn out to be correct, and a new predicted route may need to be generated and new coordinate data transmitted as a result.

At some point after being transmitted, the above-described coordinate data, process 200 may continue to block 250 where the onboard vehicle computer system may automatically receive, and without any input/request from the vehicle operator, path-relevant information from the backend server. As described above, such path-relevant information may include any information that has the potential to be useful to the vehicle operator while he/she travels along the predicted route. Such information may include, for example, business locations of interest along or near the predicted route, weather and traffic conditions that affect travel along the predicted route, and any other type of information that is specific or potentially relevant to one traveling along the predicted vehicle route (e.g., the safety information, street/road topologies, upcoming speed limit changes, points of interest, naturally occurring physical structures, etc.).

Once the onboard vehicle computer system receives any path-relevant information at block 250, process 200 may the continue to block 260 where all or some subset of that information may be presented to the vehicle operator, such as in the form of displaying such information on a vehicle display, providing an audible version of the path-relevant information, or the like. As such, the vehicle operator is presented with information that is likely to be relevant to the operator on the particular route being traveled, and without the driver having to engage in the cumbersome process of entering any destination information, or from otherwise being distracted from the road.

It should be appreciated that process 200 of FIG. 2 does not necessarily end after the operation of block 260 is performed. Rather, it is likely that process is continuous and iterative in at least some respects. In addition, the various operations of process 200 need not, and most likely will not, be performed on a sequential basis. Rather, each of the operations of blocks 210-260 may occur as individual background processes running independently of each other on a periodically, iterative or continuously basis. Additionally, while the operations of blocks 240 and 250 may require the vehicle to have some network connectivity on at least a limited basis, the operations of blocks 210-230 are preferably performed locally by the onboard vehicle computer system and without the use of any network connectivity.

In the fashion described above, the process 200 of FIG. 2 may be implemented by an onboard computer system of anyone of the vehicles 110 of FIG. 1 to automatically provide path-relevant information to a vehicle operator without requiring any input from the driver. Additionally, the path-relevant information may be based on a predicted route, where the process of predicting the vehicle route is carried out in a fashion that preserves the vehicle operator's privacy since it is performed locally in the vehicle, and is not dependent on having any network connectivity. In certain embodiments, the process may be carried out by one or more web applications utilizing standard language protocols, such as HTML5, to ensure broad and forward-looking compatibility.

While the invention has been described as improving the prior art by eliminating the need for the vehicle operator engage in the cumbersome process of entering any destination information, it should be appreciated that some level of route-based interaction with the vehicle operator is within the scope of this disclosure and would be consistent with the invention. For example, the vehicle operator may be asked to confirm the accuracy of a predicted route.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for automatically presenting, in a vehicle, path-relevant information to a vehicle operator, the method comprising the acts of:
    recording, by an HTML5 web application executing on an onboard vehicle computer in a local web storage of the HTML5 web application, vehicle route data during vehicle travel;
    generating, by the HTML5 web application executing on the onboard vehicle computer, one or more route prediction models using the vehicle route data;
    predicting, by the HTML5 web application executing on the onboard vehicle computer, a vehicle route based on the one or more route prediction models;
    transmitting, by the HTML5 web application executing on the onboard vehicle computer, coordinate data corresponding to the predicted vehicle route to a backend server over a wireless network connection;
        wherein transmitting the coordinate data comprises transmitting, by the HTML5 web application, coordinate data corresponding to a portion of the predicted vehicle route to the backend server, wherein the portion corresponds to a non-destination;
    receiving, by the HTML5 web application executing on the onboard vehicle computer and in response to the transmitted coordinate data, path-relevant information from the backend server over the wireless network connection, wherein the path-relevant information includes information corresponding to at least one non-destination location along the predicted vehicle route;
        wherein receiving the path-relevant information comprises receiving, by the HTML5 web application and in response to the transmitted portion of the predicted vehicle route, path-relevant information corresponding to only the transmitted portion of the predicted vehicle route; and
    presenting at least a portion of the path-relevant information to the vehicle operator.

2. The method of claim 1, wherein presenting comprising displaying the at least portion of the path-relevant information on a display screen of the vehicle.

3. The method of claim 1, wherein the method is implemented automatically without input from the vehicle operator.

4. The method of claim 1, wherein recording comprises recording, by the HTML5 web application executing on the onboard vehicle computer, current GPS coordinates, time of day and day of week information in the local web storage.

5. The method of claim 1, wherein said recording comprises recording the vehicle route data on one of a continuous, periodic and movement basis.

6. The method of claim 1, wherein predicting the vehicle route comprises predicting, by the HTML5 web application executing on the onboard vehicle computer, the vehicle route based on one or more algorithms that receive, as inputs, current and historical driving behavior data, and which output probability information corresponding to a most likely current route being traveled by the vehicle.

7. The method of claim 1, wherein the path-relevant information comprises at least one of business locations, weather conditions, traffic conditions, safety information, street/road topologies, upcoming speed limit changes, points of interest, and naturally occurring physical structures.

8. The method of claim 1, wherein the portion of the predicted vehicle route corresponds to a portion of the predicted vehicle route closest to a current position of the vehicle.

9. An onboard vehicle computer system of a vehicle comprising:
    a network interface;
    a user interface;
    a GPS transceiver;
    a processor coupled to the network interface, user interface and the GPS transceiver; and
    a memory coupled to the processor, the memory having an HTML5 web application that, when executed by the processor, causes the onboard vehicle computer system to:
        record, in a local web storage of the HTML5 web application, vehicle route data during vehicle travel,
        generate one or more route prediction models using the vehicle route data, predict a vehicle route based on the updated one or more route prediction models,
        transmit coordinate data corresponding to the predicted vehicle route to a backend server over a wireless network connection via the network interface,
            wherein transmit coordinate data corresponding to a portion of the predicted vehicle route to the backend server, wherein the portion corresponds to a non-destination,
        receive, in response to the transmitted coordinate data, path-relevant information from the backend server over the wireless network connection via the network interface, wherein the path-relevant information includes information corresponding to at least one non-destination location along the predicted vehicle route,
            wherein receive, in response to the transmitted portion of the predicted vehicle route, path-relevant information corresponding to only the transmitted portion of the predicted vehicle route, and
        present at least a portion of the path-relevant information to a vehicle operator.

10. The onboard vehicle computer system of claim 9, wherein the HTML5 web application is to further cause the onboard vehicle computer system to present the at least portion of the path-relevant information using a display screen of the vehicle.

11. The onboard vehicle computer system of claim 9, wherein the HTML5 web application is executed by the processor automatically without input from the vehicle operator.

12. The onboard vehicle computer system of claim 9, wherein the vehicle route data comprises current GPS coordinates, time of day and day of week information.

13. The onboard vehicle computer system of claim 9, wherein the HTML5 web application is executed by the processor in order to record said vehicle route data on one of a continuous, periodic and movement basis.

14. The onboard vehicle computer system of claim 9, wherein the HTML5 web application is executed by the processor to predict the vehicle route based on one or more algorithms that receive, as inputs, current and historical driving behavior data, and which output probability information corresponding to a most likely current route being traveled by the vehicle.

15. The onboard vehicle computer system of claim 9, wherein the path-relevant information comprises at least one of business locations, weather conditions, traffic conditions, safety information, street/road topologies, upcoming speed limit changes, points of interest, and naturally occurring physical structures.

16. The onboard vehicle computer system of claim 9, wherein the portion of the predicted vehicle route corresponds to a portion of the predicted vehicle route closest to a current position of the vehicle.

17. A computer program product comprising:
a processor storage medium having computer executable program code embodied therein to automatically present, in a vehicle, path-relevant information to a vehicle operator, the processor storage medium having an HTML5 web application to:
record, in a local web storage of the HTML5 web application, vehicle route data during vehicle travel,
generate one or more route prediction models using the vehicle route data,
predict a vehicle route based on the updated one or more route prediction models,
transmit coordinate data corresponding to the predicted vehicle route to a backend server over a wireless network connection,
wherein transmit the coordinate data by transmitting coordinate data corresponding to a portion of the predicted vehicle route to the backend server, wherein the portion corresponds to a non-destination,
receive, in response to the transmitted coordinate data, path-relevant information from the backend server over the wireless network connection, wherein the path-relevant information includes information corresponding to at least one non-destination location along the predicted vehicle route,
wherein receive the path-relevant information by receiving, in response to the transmitted portion of the predicted vehicle route, path-relevant information corresponding to only the transmitted portion of the predicted vehicle route, and
present at least a portion of the path-relevant information to the vehicle operator.

18. The computer program product of claim 17, wherein the HTML5 web application is further to display the at least portion of the path-relevant information on a display screen of the vehicle.

19. The computer program product of claim 17, wherein the HTML5 web application is executable automatically without input from the vehicle operator.

20. The computer program product of claim 17, wherein the HTML5 web application is to record current GPS coordinates, time of day and day of week information in the local storage.

21. The computer program product of claim 17, wherein the HTML5 web application is to record the vehicle route data on one of a continuous, periodic and movement basis.

22. The computer program product of claim 17, wherein the HTML5 web application is to predict the vehicle route based on one or more algorithms that receive, as inputs, current and historical driving behavior data, and which output probability information corresponding to a most likely current route being traveled by the vehicle.

23. The computer program product of claim 17, wherein the path-relevant information comprises at least one of business locations, weather conditions, traffic conditions, safety information, street/road topologies, upcoming speed limit changes, points of interest, and naturally occurring physical structures.

24. The computer program product of claim 17, wherein the portion of the predicted vehicle route corresponds to a portion of the predicted vehicle route closest to a current position of the vehicle.

* * * * *